INVENTORS
MARSHALL D. MCSHURLEY
DONALD G. MAHONEY

BY *Willets Hardman*

THEIR ATTORNEYS

United States Patent Office 2,707,313
Patented May 3, 1955

2,707,313

APPARATUS FOR DISTRIBUTING MOLTEN METAL TO MOLDING MACHINES

Marshall D. McShurley, Daleville, and Donald G. Mahoney, Muncie, Ind., assignors to General Motors Corporation, Detroit, Mich., a corporation of Delaware Application April 19, 1951, Serial No. 221,902

1 Claim. (Cl. 22—79)

This invention relates to apparatus for distributing molten material to a plurality of operating stations, for example, molten lead to a plurality of molding machines.

It is, therefore, a basic object of the invention to provide an apparatus for distributing molten material, at a constant pressure, to a plurality of operating stations wherein the material is heated in a reservoir and is then pumped to a distributing line wherein it flows by gravity back to the reservoir. Downwardly extending take-offs in said distributing line supply the material to the various operating stations whereby the pressure head at any one station is substantially constant and is measured by the length of the take-off.

A still further object of the invention is to provide an apparatus for distributing molten material wherein the molten material is constantly pumped to an inclined feeder wherein it is maintained substantially at atmospheric pressure and wherein portions of said material are bled off at different operating stations, the remaining portion being returned for recirculation in the system.

Another object of the invention is to provide an apparatus wherein a heated and insulated distributing pipe, disposed at a slight angle of inclination, is connected to a reservoir through a pump so that the material pumped into the feeder or distribution pipe will circulate therethrough by gravity and return to the reservoir for reheating. Take-off pipes, also insulated and heated, are provided along said feeder for supplying apparatus at different operating stations and each take-off pipe preferably includes regulating means adjacent the outlet thereof together with a chill band which is operative to freeze the molten material in the pipe whereby the take-off is rendered inoperative as desired by the operator of the apparatus.

Further objects and advantages of the present invention will be apparent from the following description, reference being had to the accompanying drawings, wherein preferred embodiments of the present invention are clearly shown.

The present invention is directed to distributing systems for any type of molten material and for illustrative purposes only, it will here be applied to a distributing system for molten lead or lead alloy material.

In past setups for molding articles, such as storage battery grids, from molten lead material, it has been the usual practice to supply each molding machine with its own melting pot for the lead material, which pot was disposed above the machine wherein the material flowed by gravity into the ladle of the machine. It is quite apparent that in this setup, the level of the lead in the melting pot varied as lead was drawn off, which variation changed the pressure head at the outlet thereof. Thus, varying quantities of lead were fed to the ladle in like time periods. This made it necessary to provide an operator for closely controlling the machine whereby pig lead or lead alloy was added to the melting pot at frequent intervals in order to keep the molten lead level therein as nearly constant as possible. In all cases, however, the pressure head varied sufficiently to cause improper filling of the molds when the head was too low and over-flow of the lead when the reservoir level was too high. Furthermore, the use of separate pots for each machine was costly and required considerable heating equipment.

Figure 1:
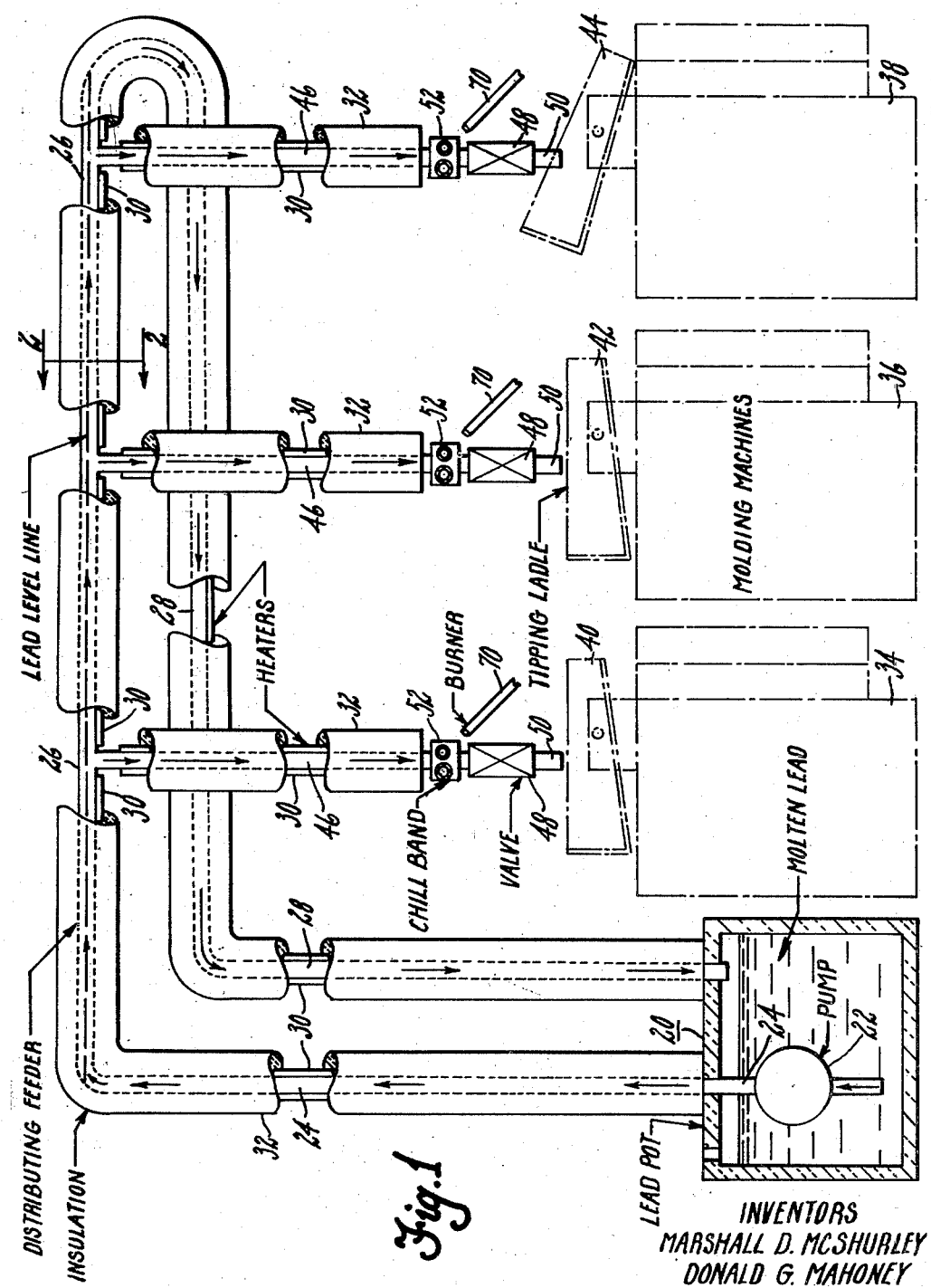
Fig. 1 is a diagrammatic view of a distributing system as used, for illustrative purposes only, in connection with a plurality of molding machines.
Figure 2:
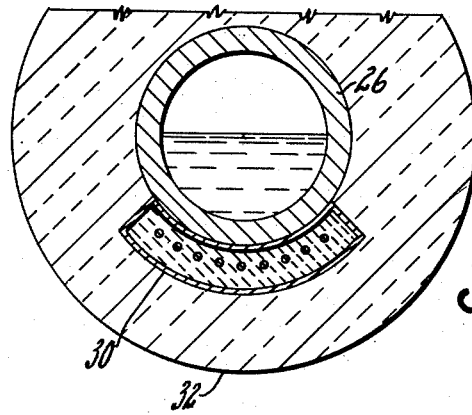
Fig. 2 is a view taken on line 2—2 of Fig. 1 and is a section through the distributing feeder showing the preferred level of molten material therein, a strip heater and the insulation.

The present invention is directed to a distributing system wherein a single melting pot, as shown at 20 in Fig. 1, is utilized for the lead which includes a pump 22 therein and an outlet pipe 24 which extends upwardly to a distributing feeder 26 which is substantially horizontal, although inclining downwardly slightly away from the vertical supply line 24. The feeder 26 extends any desired distance and then is connected to a return line 28 which carries the molten lead, that has not been utilized, back to the reservoir 20 where it is reheated by suitable means, not shown. Thus pump 22 causes a constant circulation of molten lead through the supply line 24, feeder 26 and return line 28. Pump 22 is preferably adjusted so that the level in the feeder 26 does not fill the pipe but preferably fills the pipe about one-half so that the lead is at substantially atmospheric pressure at all time and the flow of the lead in the feeder and return is by gravity alone.

In order to maintain the lead at the desired temperature in the various pipes, a plurality of strip heaters 30 are strapped to the pipes at various points therealong which are preferably electrically heated and maintain the various pipes at a desired temperature. Heavy insulation 32 is also provided over the pipes for preventing excessive heat loss.

In order to feed lead to various operating stations, in this instance molding machines, as noted at 34, 36 and 38 which include ladles of the tipping variety at 40, 42 and 44, respectively, a plurality of take-off pipes 46 are provided which are identical in design and include strip heaters 30 and insulation 32 thereon. Each take-off pipe comes from a distributing feeder 26 and includes a valve 48 and the lower end thereof directly above the outlet 50 which exhausts molten lead into the ladle. Also included on each take-off 46 is a chill band 52 to be explained in detail hereinafter. It will be noted that since the distributing feeder 26 is in a generally horizontal plane but with a slight incline, we prefer to use about one inch drop for each ten feet, that the lead level is substantially constant throughout the length thereof. Furthermore, each take-off 46 is of a defined length and since the valve 48 forms a restriction at the lower end thereof, each take-off 46 is always full of molten material whereby a constant pressure head is maintained. It is apparent that no matter how the level of the molten material in the reservoir 20 varies, the head of molten material in each take-off is constant whereby automatic opening operation of valves 48 always supplies the same quantity of material to the tipping ladles 40 through 44, respectively.

In this manner, the molding machines, which may be of any type, one of which is clearly disclosed in Bruner application, Serial No. 166,875, filed June 8, 1950, are always supplied constant quantities of metal for molding whereby the operation is facilitated and a single operator may be used on a plurality of machines due to the constant pressure head maintained at each machine. Manifestly there is no opportunity for over or under-filling of the molds. The melting pot or reservoir 20 may be replenished with pig at any time, the only critical control being the level of the lead therein which must be maintained above the inlet of the pump 22.

Thus it will be seen that the apparatus as disclosed, not only facilitates the molding operation but improves the quality of the product made thereby due to the fact that the molds are always filled with the same quantity of material on each operation and likewise the labor costs of the setup are markedly reduced while the control factors, such as lead level in the reservoir and the like, are reduced so as not to require such critical control.

Figure 3:
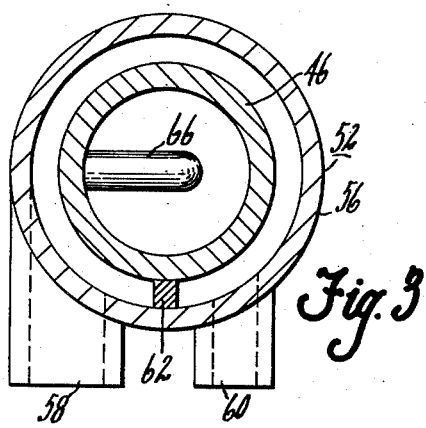
Fig. 3 is a view taken on the line 3—3 of Fig. 4, showing the section through the chill band.
Figure 4:
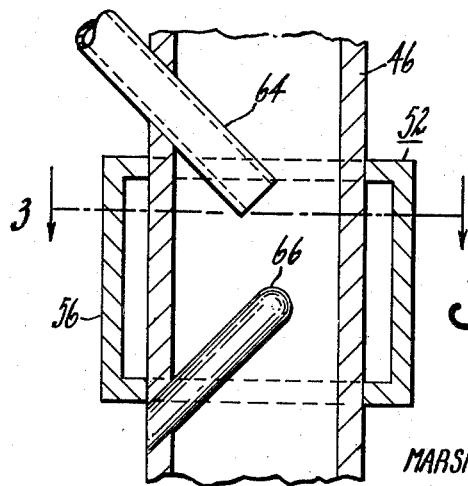
Fig. 4 is a vertical, sectional view of a portion of a take-off pipe, showing the chill band, thermocouple, etc.

Referring particularly to the chill band 52 as shown in Figs. 3 and 4, the take-off pipe 46 includes a hollow collar 56 therearound which includes an inlet 58 and an outlet 60 adapted to convey water in and out of the band 52. A baffle 62 is provided so that the water must necessarily enter at 58 and leave at 60. A thermocouple may be provided at 64 or a pin 66 may be utilized which extends into the area surrounded by the chill band within the take-off pipe 46, the use of this pin and/or thermocouple will be explained hereinafter.

The chill band is basically used to cut off, or render inoperative, selective take-off pipe 46. For example, if valve 48 commences to leak during the automatic operation of the machine, it is desirable to cut off the operation of the molding machine 34 while permiting molding machines 36 and 38 to continue operation and to repair the valve 48 or replace same. In order to do this, the chill band is utilized wherein water is circulated therearound which freezes the molten material in the area surrounded thereby the thermocouple 64 and/or pin 66 maintains this frozen material in position within the area of the chill band and does not permit it to slip since it is merely a slug of frozen material which might conceiveably, in a smooth pipe, slide out of place if no restricting device, such as the pin 66 or thermocouple 64, were provided. After the material is frozen in the area of the chill band 52, valve 48 may be removed, repaired or replaced whereupon the water in the band 52 is turned off and a burner 70 is turned on which plays a flame upon the area of the chill band and remelts the material whereupon the station is again operative.

It will be manifest that, although the drawings merely show three operating stations, any number compatible with the capacity of the pump 22 and the distributing feeder 26, may be provided and that the drawings are merely illustrative of one particular setup.

It is also apparent that a distributing system of this character may be used in many other applications where molten material is desired to be distributed to various operating stations and therefore our invention is not limited to the distribution of molten lead alone but may be used in connection with any multiple operations on molten flowable material.

While the embodiments of the present invention as herein disclosed, constitute preferred forms, it is to be understood that other forms might be adopted.

What is claimed is as follows:

A constant pressure distributing system for use with molten materials, comprising in combination; a melting pot for containing a large supply of molten material, a pump within said pot, a heated and insulated virtical supply line extending upwardly from said pot and connecting at its upper end with a heated and insulated distributing feeder, said feeder extending in a generally horizontal plane with a slight incline downwardly away from said supply line, a heated and insulated return line connecting the lower end of said feeder to said pot for forming a circulatory system, said system being adapted to circulate molten material at substantially atmospheric pressure, a plurality of vertically connected heated and insulated downwardly extending take-off pipes spaced along said feeder and each adapted to feed to tis corresponding machine to be supplied with molten material, and intermittently actuated valve means disposed in each of said take-off pipes, each valve in conjunction with the substantially constant pressure head of molten material in the take-off pipes above the valve being adapted to discharge a quantity of molten material, said quantity varying directly with the time the valve is held open.

References Cited in the file of this patent

UNITED STATES PATENTS

| Number | Name | Date |
|---|---|---|
| 579,293 | Capehart | Mar. 23, 1897 |
| 637,120 | Hunter | Nov. 14, 1899 |
| 835,520 | Goss | Nov. 13, 1906 |
| 1,220,211 | Feldkamp et al. | Mar. 27, 1917 |
| 1,433,278 | Hopkins | Oct. 24, 1922 |
| 1,707,324 | Schlecker | Apr. 2, 1929 |
| 1,724,914 | Davis et al. | Aug. 20, 1929 |
| 1,817,483 | Goad et al. | Aug. 4, 1931 |
| 1,906,636 | Schlecker | May 2, 1933 |
| 2,019,727 | Quinn et al. | Nov. 5, 1935 |
| 2,085,450 | Rohn | June 29, 1937 |
| 2,135,245 | Yerkey | Nov. 1, 1938 |
| 2,218,171 | Junghans | Oct. 15, 1940 |
| 2,232,886 | Robertson et al. | Feb. 25, 1941 |
| 2,364,615 | Beckes | Dec. 12, 1944 |
| 2,459,892 | Palmer et al. | Jan. 25, 1949 |

FOREIGN PATENTS

| Number | Country | Date |
|---|---|---|
| 243,812 | Great Britain | Dec. 7, 1925 |